United States Patent [19]
Tanaka et al.

[11] Patent Number: 5,155,688
[45] Date of Patent: Oct. 13, 1992

[54] VEHICLE NAVIGATION SYSTEM

[75] Inventors: Ichiro Tanaka; Hiroshi Noda, both of Amagasaki; Yo Yoshitoshi; Hirofumi Goto, both of Sanda, all of Japan

[73] Assignee: Mitsubishi Denki Kabushiki Kaisha, Tokyo, Japan

[21] Appl. No.: 599,600

[22] Filed: Oct. 18, 1990

[30] Foreign Application Priority Data

Oct. 24, 1989 [JP] Japan .................................. 1-277523

[51] Int. Cl.⁵ .............................................. G01C 21/00
[52] U.S. Cl. .................................... 364/454; 340/988; 340/995; 364/449; 364/460
[58] Field of Search ............... 364/449, 454, 444, 447, 364/457, 460; 340/988, 995; 342/357, 457

[56] References Cited

U.S. PATENT DOCUMENTS

| | | | |
|---|---|---|---|
| 3,789,198 | 2/1974 | Henson et al. | 235/150.27 |
| 4,807,127 | 2/1989 | Tenmoku et al. | 364/424.01 |
| 4,899,285 | 2/1990 | Nakayama et al. | 364/449 X |
| 4,903,212 | 2/1990 | Yokouchi et al. | 364/449 |

FOREIGN PATENT DOCUMENTS

| | | |
|---|---|---|
| 2910386 | 9/1980 | Fed. Rep. of Germany . |
| 3044146 | 10/1981 | Fed. Rep. of Germany . |
| 3222285 | 12/1982 | Fed. Rep. of Germany . |
| 3310111 | 9/1984 | Fed. Rep. of Germany . |
| 3642986 | 7/1988 | Fed. Rep. of Germany . |
| 63-6414 | 1/1988 | Japan .................................. 364/449 |

*Primary Examiner*—Parshotam S. Lall
*Assistant Examiner*—Edward J. Pipala
*Attorney, Agent, or Firm*—Rothwell, Figg, Ernst & Kurz

[57] ABSTRACT

In a vehicle location detecting system having a self-contained type location detecting section for determining the accumulation type location data, a satellite navigation type location detecting section for determining the satellite type location data from satellite navigation data, a synthesizing section calculates synthetic location data from the accumulation type location data and the satellite navigation type location data. An on-road location determining section determines an on-road location of the vehicle in accordance with the synthetic location data and road map data stored in a road map memory. A display sectin displays the on-road location determined by the on-road location determining section.

4 Claims, 2 Drawing Sheets

VEHICLE NAVIGATION SYSTEM

FIELD OF THE INVENTION

This invention relates to a vehicle navigation system for detecting the instantaneous location of the vehicle. Here, the term vehicle means any kind of moving object which can travel on the surface of the earth, along roads. The term "road" used herein should be construed to include streets, highways, and any other surfaces over which the vehicle can travel.

BACKGROUND OF THE INVENTION

An example of a prior art system is shown in FIG. 1. P0 is assumed to be the preset starting location or the last-calculated on-road location of the vehicle. Taking P0 as a reference, the travel distance and the direction change are measured by accumulation or integration of the movement of the vehicle, and the results of the measurement are used for the determination of the accumulation type data of present location P1. The accumulation type location data P1 is then compared with the road map data that is stored in advance, and on-road data r1 to r3 which are within a predetermined error range E are determined, and the accumulation type location data P1 is correlated with road data $r_1$ to $r_3$ to find on-road locations P11 to P13 which are within the predetermined error range E, and an evaluation function is determined for each of the on-road locations P11 to P13, and the on-road location P12 having the highest evaluation function is selected and displayed on the display means. The on-road locations P11 to P13 are used as references for the determination of the accumulation type location data and the on-road locations in the next cycle.

In FIG. 1, F shows the locus of the accumulated data location, and G shows the actual route of the vehicle.

A problem associated with the prior art is that a plurality of on-road locations may be generated (this is the case if there are a plurality of road data within the predetermined error range from the accumulated data location), and all of them are stored as the present locations of the vehicle. The number of present locations that are stored in the memory thus increases with time. Moreover, the accumulated data location determined from the travel distance and the direction change contain considerable errors, and the on-road locations determined from the accumulated data locations therefore are not accurate.

SUMMARY OF THE INVENTION

An object of the invention is to provide a vehicle navigation system which can reduce the number of data that must be stored in the memory and which can determine the present location with a higher accuracy.

A vehicle navigation system according to the invention comprises:

a self-contained type location detecting section for determining the accumulation type location data by accumulation of the movement of the vehicle;

a satellite navigation type location detecting means for determining the satellite type location data from satellite navigation data transmitted from a plurality of satellites arranged for constituting the global positioning navigation system;

a synthesizing means for determining synthetic location data in accordance with the accumulation type location data and the satellite navigation type location data;

a road map memory for storing road data;

an on-road location determining means for determining an on-road location of the vehicle in accordance with the synthetic location data and the road map data stored in the road map memory; and a display means for displaying the on-road location determined by said on-road location determining means.

DETAILED DESCRIPTION OF THE PREFERRED EMBODIMENTS

Figure 2:
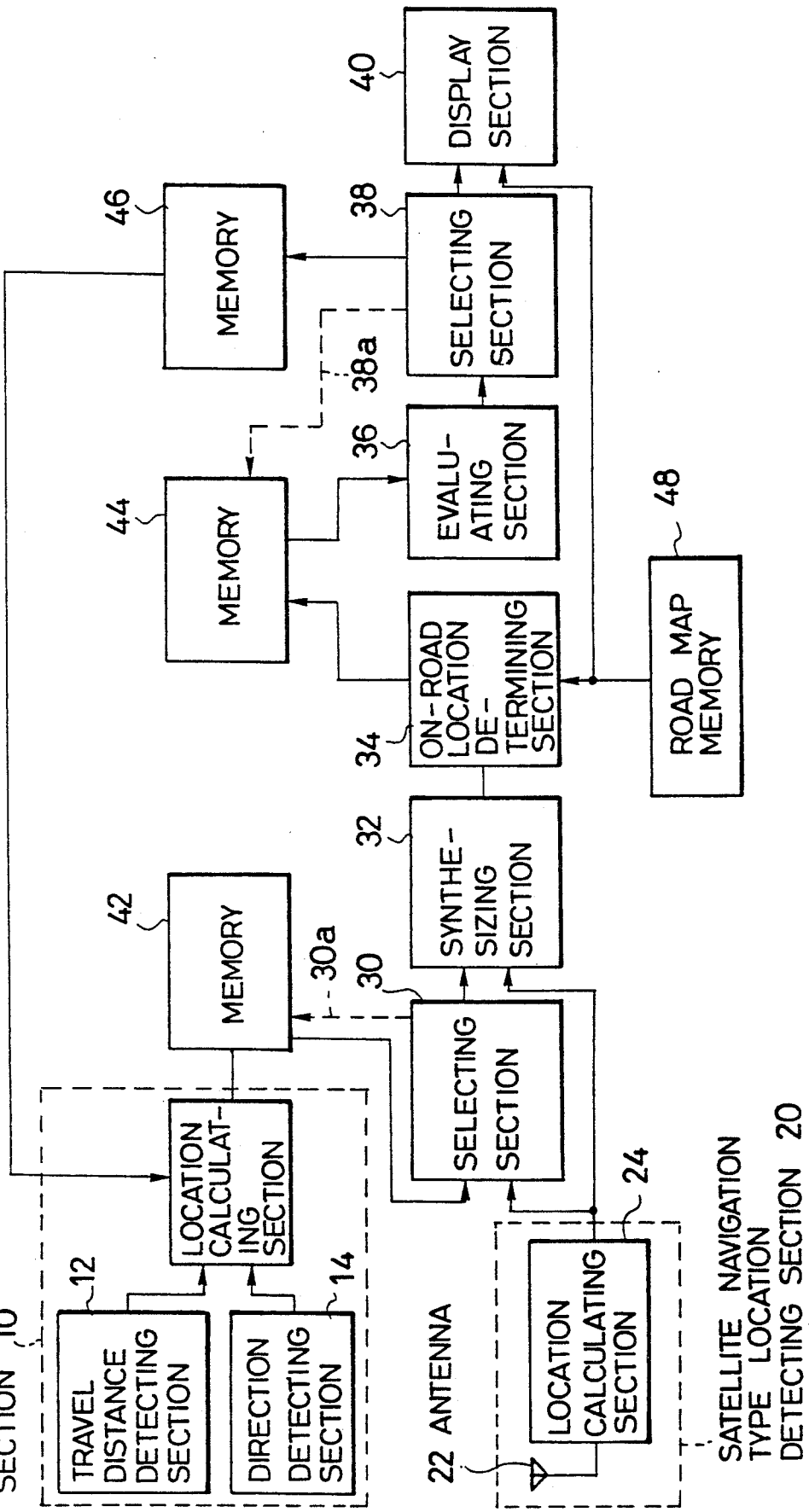
FIG. 2 is a block diagram showing a vehicle navigation system of an embodiment of the invention.

An embodiment of the invention will now be described with reference to the drawings. FIG. 2 shows a vehicle navigation system of an embodiment of the invention.

It comprises a self-contained type location detecting section 10 which includes a travel distance detecting section 12 for detecting the travel distance of a vehicle. A direction detecting section 14 detects the direction or heading angle of the vehicle. In accordance with the outputs of the travel distance detecting section 12 and the direction detecting section 14, as well the preset starting location or last-calculated values of the location, which is stored in a memory 46, a location calculating section 16 calculates one or more candidate coordinate values for the present location (self-contained type location data or accumulation type location data) of the vehicle.

The calculated accumulation type location data are stored in a memory 42.

A satellite navigation type location detecting section 20 comprises an antenna 22 for receiving signals in the form of electromagnetic waves transmitted from a plurality of satellites constituting the Global Positioning System (GPS), which transmits the signals simultaneously and at a predetermined interval. The signals represent time data indicative of the time at which the signal was transmitted from the satellite, and orbit data indicative of the location of the satellite. On the basis of these data, a location calculating section 24 calculates the coordinate values of the present location (satellite navigation type location data) of the vehicle.

A selecting section 30 reads the calculated accumulation type location data from the memory 42, and also receives the satellite navigation type location data from the location calculating section 24, and selects the accumulation type location data that is closest to the satellite navigation type location data, from among the calculated accumulation type location data. The unselected accumulation type location data are erased from the memory 42 responsive to a control signal 30a from the selecting section 30.

A synthesizing section 32 receives the selected accumulation type location data from the selecting section 30, and the satellite navigation type location data from the location calculating section 24, and synthesizes them to obtain a synthetic location data.

Specifically, a weighted mean of the selected accumulated data location and the satellite navigation location is calculated. Assuming that $x_s$, $y_s$ represent the coordinate values of the accumulated data location on X-Y coordinate system, and $x_g$, $y_g$ represent the coordinate values of the satellite navigation location on X-Y coordinate system, and $w_1$ and $w_2$ represent weighting factors, with their sum being equal to 1 ($w_1+w_2=1$), a weighted mean location (x, y) is then determined in accordance with the following equations:

$$\left. \begin{array}{l} x = w_1 x_s + w_2 x_g \\ y = w_1 y_s + w_2 y_g \end{array} \right\} \quad (1)$$

An on-road location determining section 34 receives the synthetic location data and a road map data from a road map memory 48, and finds the on-road locations which are within a predetermined error range from the synthetic location data. Data indicating the on-road locations which have been found within the error range are stored in a memory 44.

It is possible that a plurality of on-road locations are found to exist within the error range, so data indicating more than one on-road location data may be stored in the memory 44.

An evaluating section 36 reads the data indicating the on-road locations from the memory 44, and calculates the evaluation function value of each of the on-road locations with respect to the synthetic location data.

An example of the evaluation function is explained next. First, the direction evaluation function $f_d$ ($0 \leq f_d \leq 1$) is given by:

$$f_d(\alpha \cdot \beta_n) = 1 - \frac{|\alpha - \beta_n|}{\theta} \quad (2)$$

If however $f_d$ is found to be smaller than 0 according to the formula (2), $f_d$ is set to be 0.

Figure 1:
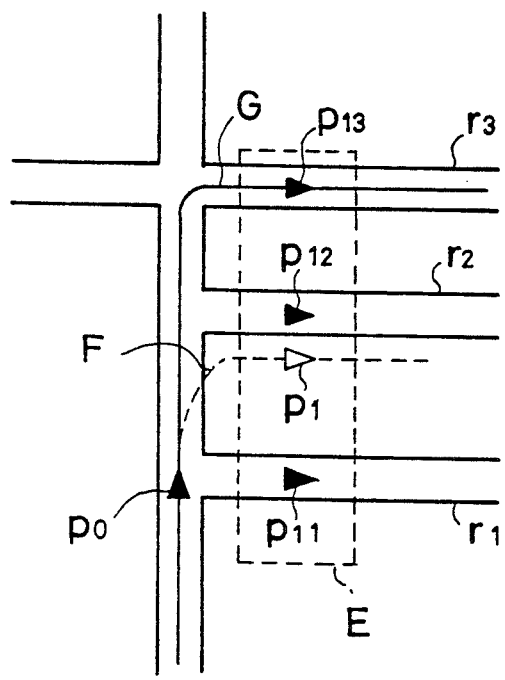
FIG. 1 is a diagram for explaining the prior art navigation system.
Figure 3:
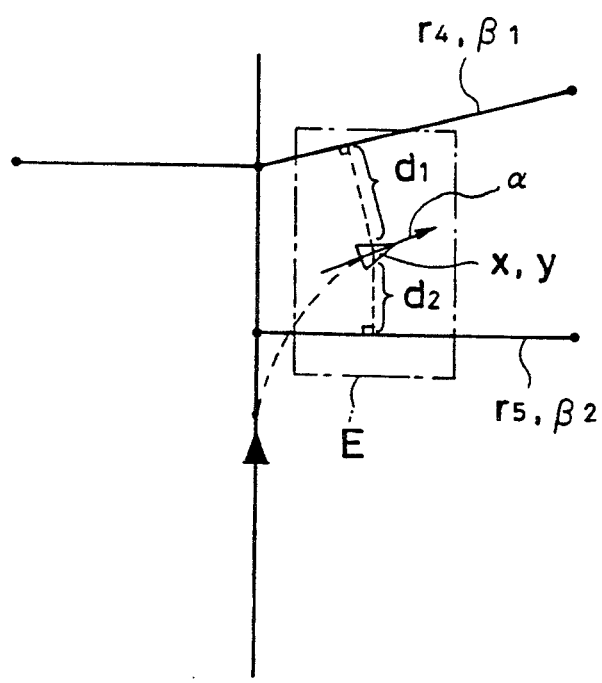
FIG. 3 is a diagram for explaining the calculation of the evaluation function according to the embodiment of the invention.

In the above equation, $\theta$ ($>0$) is a constant, $\alpha$ is the direction of the vehicle at the synthetic location data (x, y) in FIG. 3, and $\beta_n$ is the direction $\beta_1$ or $\beta_2$ of the road data $r_4$ or $r_5$ within the predetermined error range from the synthetic location data, as shown in FIG. 3.

The location evaluation function $f_p$ ($0 \leq f_p \leq 1$) is given by:

$$f_p(x,y) = 1 - \frac{d_n}{L} \quad (3)$$

If, however, $f_p$ is found to be smaller than 0 according to the formula (3), $f_p$ is set to be 0.

In the above equation, $L$ ($>0$) is a constant, $d_n$ is the length $d_1$ or $d_2$ of the perpendicular lines from the location represented by the synthetic location data (x,y) onto the road represented by the road data $r_4$, $r_5$.

The synthetic evaluation function f ($0 \leq f \leq 1$) is given by:

$$f = w_3 f_p + w_4 f_d \quad (4)$$

where $w_3$, $w_4$ are weighting factors, with their sum being equal to 1 (i.e., $w_3 + w_4 = 1$).

A selecting section 38 receives the calculated synthetic evaluation values from the evaluating section 36, and selects the on-road location having the highest evaluation function value. The data of the unselected on-road locations are erased from the memory 44 responsive to a control signal 38a from the selecting section 38.

The selected on-road location is stored in the memory 46, and is also sent to a display section 40, which displays the on-road location. This display consists for example of a mark representing the vehicle superimposed on a road map.

In the above embodiment, only one of a plurality of the accumulation type location data which may be created is selected by comparison with the satellite navigation type location data and the selected accumulation type location data is retained in the memory while other unselected accumulation type location data are erased from the memory. As a result, increase of the number of accumulation type location data as stored in the memory can be prevented. Moreover, the accumulation type location data is synthesized with the satellite navigation type location data which is more accurate, and the synthetic location data is used for the determination of the on-road location. The on-road location can therefore be determined more accurately.

What is claimed is:

1. A vehicle location detecting system provided in a vehicle for detecting the location thereof, comprising:

self-contained type location detecting means for calculating accumulation-type location data based on motion signals from sensors mounted on said vehicle;

satellite navigation type location detecting means for calculating satellite-type location data from satellite location data transmitted by a plurality of satellites constituting a global positioning system (GPS) navigation system;

memory means for storing accumulation-type location data calculated by said self-contained type location detecting means;

means for selecting accumulation-type location data from said memory means which is closest to said calculated satellite-type location data;

synthesizing means for calculating synthetic location data based on the selected accumulation-type location data from said memory means and said calculated satellite-type location data;

a road map memory for storing road map data;

on-road location detecting means for calculating an on-road location of said vehicle based upon said synthetic location data and said road map data; and display means for displaying the calculated on-road location of said vehicle.

2. A system according to claim 1, wherein said synthesizing means comprises means for calculating a weighted mean of the accumulation type location data and the satellite navigation type location data.

3. A system according to claim 1, further comprising:

an on-road location data memory for storing on-road location data determined by said on-road location determining means;

evaluating means for calculating an evaluation function for each of the on-road location data stored in said on-road location data memory; and selecting means for selecting on-road location data having the highest evaluation function from among the stored on-road location data, and erasing unselected on-road location data from said on-road location data memory;

wherein said display means displays the on-road location data that is selected by said selecting means.

4. A system according to claim 1, wherein said self-contained type location detecting means comprises:
   travel distance detecting means for detecting a travel distance of the vehicle;
   direction detection means for detecting a travel direction of the vehicle; and
   accumulation type location data calculating means for calculating the location of the vehicle from the travel distance and the direction.

* * * * *